United States Patent Office 3,649,687
Patented Mar. 14, 1972

3,649,687
1,3,5-CYCLOHEXANE TRICARBONYL CHLORIDE
Herman H. Weyland, Folsom, and Edward E. Hamel,
 Roseville, Calif., assignors to Aerojet-General Corporation, El Monte, Calif.
No Drawing. Original application Nov. 6, 1967, Ser. No. 680,985, now Patent No. 3,551,469, dated Dec. 29, 1970. Divided and this application July 6, 1970, Ser. No. 52,682
Int. Cl. C07c 61/10
U.S. Cl. 260—544 L
1 Claim

ABSTRACT OF THE DISCLOSURE

The new compound 1,3,5-cyclohexane tricarbonyl chloride especially suitable for the preparation of the cross-linking agent 1,3,5-cyclohexane triisocyanate.

This application is a divisional application of co-pending application Ser. No. 680,985 filed Nov. 6, 1967, now Pat. No. 3,551,469.

Isocyanates have been long well-known as cross-linking and chain-extending compounds useful in curing polymers to rubber-like solid materials. In other words, isocyanates are generally recognized as cross-linking or curing agents. The most common isocyanate utilized in the past for curing material such as hydroxy-terminated polybutadiene was toluene diisocyanate, TDI. The problem with TDI and other diisocyanates is that there are only two of the functional isocyanate groups, —NCO, presently in a molecule. This limits the diisocyanates to utilization mainly as chain-extenders when reacted with functional polymeric material such as hydroxy-terminated polybutadiene, and one cannot readily achieve a cross-line network to obtain a hard product. On the other end of the spectrum there is a polyfunctional isocyanate utilized which is polymethylene polyphenylisocyanate. This compound has this advantage in that the functionality is within a range not well determined so that one cannot easily predict the amount required to achieve a desired cross-linked network or cure state.

Thus it is an object of this invention to provide a new isocyanate compound capable of achieving cross-linking when reacted with polymeric materials in a controlled manner.

A further object of this invention is to provide a trifunctional isocyanate compound.

One other object of this invention is to provide a method for making a new trifunctional isocyanate.

Still another object of this invention is to provide a new intermediate compound used in the method of making the product of this invention.

The above and other objects of this invention are accomplished by a novel trifunctional isocyanate, 1,3,5-cyclohexane triisocyanate having the formula:

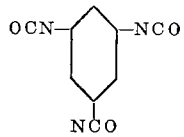

The compound is a low melting solid having a melting point of 35° C. and when made in accord with the method set forth in this invention has a high purity of in excess of 97%.

The method for forming the compound of this invention is a two-step process. The first step is to form 1,3,5-cyclohexane tricarbonyl chloride, a new intermediate compound. This can be accomplished, as will be explained, through three different approaches. The second step in the process relates to the formation of 1,3,5-cyclohexane tricarbonyl azide in situ, followed by its thermal rearrangement to give the 1,3,5-cyclohexane triisocyanate of this invention.

At least three methods are suitable for preparing the intermediate 1,3,5-cyclohexane tricarbonyl chloride. The three methods involve the treatment of the initial starting compound, 1,3,5-tricarboxycyclohexane with a chlorine-containing compound. The first method contemplated involves the use of $PCl_5$ in $POCl_3$. The second method utilizes $Cl_2$ in $PCl_3$, while the third method involves treating the starting compound with $SOCl_2$. The third method is preferable to the first two, since the thionyl chloride, $SOCl_2$, is less expensive and avoids special handling techniques which would be required for the phosphorous-containing compounds in the first two methods. Thus, utilizing for example, thionyl chloride, the first step of the reaction would appear as below.

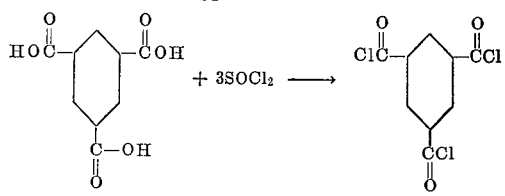

The preceding reaction is carried out at a reflux temperature while the materials are being stirred. Generally it is preferred to use an excess of the thionyl chloride above the stoichiometrically required to assure complete reaction. The liberated gases can be analyzed by titration to determine when the reaction is complete. The excess thionyl chloride is then removed in vacuo, leaving a crude amber liquid which is the desired 1,3,5-cyclohexane tricarbonyl chloride. This crude material can then be vacuum distilled to get a pure colorless liquid. Generally in the reaction the excess thionyl chloride referred to can be as low as 10% excess without affecting the crude yield. Conventional solvents may be used in the reaction but are not necessary, since the solubility of the product in thionyl chloride serves as an adequate reaction medium. It is noted that no mention was made of a catalyst as one is not required since the reaction proceeds quite smoothly in a short time period.

After its formation, the 1,3,5-cyclohexane tricarbonyl chloride is then reacted with sodium azide in a biphase water-chloroform mixture to obtain 1,3,5-cyclohexane tricarbonyl azide in situ in the chloroform layer. After separation and drying of the 1,3,5-cyclohexane tricarbonyl azide chloroform layer, it is thermally rearranged to form the product of this invention in accord with the following overall reaction:

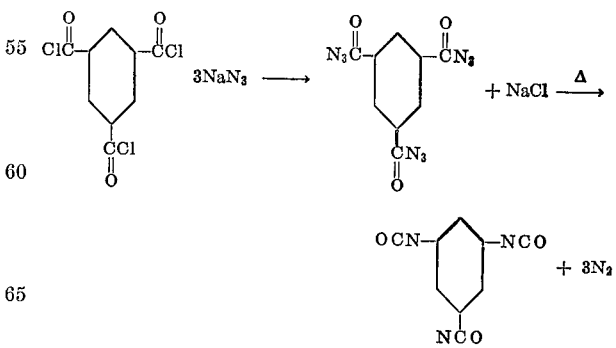

The formation of the 1,3,5-cyclohexane tricarbonyl azide is preferably carried out at 5° to 10° C. This temperature range is used to prevent decomposition of the azide intermediate. Upon completion of the reaction after about one hour, the layers are separated, and the chloroform layer containing the azide is washed with water. The solution after being washed can be dried over anhydrous magnesium sulfate or other suitable material, and then added slowly to a flask of refluxing chloroform. During this stage, the rearrangement of the 1,3,5-cyclohexane tricarbonyl azide to the product of this invention occurs. Completion of the reaction is determined by measurement of the liberated nitrogen gas. The chloroform solvent is then removed in vacuo, leaving a high yield of the crude product of the invention. The crude product is then vacuum distilled to give a colorless mobile material.

While vacuum distillation will serve to provide a pure product of this invention, it is generally preferred to purify the crude product by a low temperature recrystallization. In the recrystallization the crude product of the invention is mixed with a suitable solvent, such as N-butyl chloride. After thorough mixing, the composition is then slowly cooled. Crystals form between 0° and −10° C. Generally the composition is lowered to at least −30° C. The supernatant liquid is poured from the crystals, the crystals are then dissolved in a minimal amount of N-butyl chloride and heated to 30° to 40° C. and recrystallized as described before. The crystals again formed are separated from the solvent and the remaining solvent is evaporated from the crystals. A purity in execss of 97% can be achieved through this method.

It is believed the invention will be further understood from the following detailed examples.

EXAMPLE I

In order to prepare the necessary intermediate compound 1,3,5-cyclohexane tricarbonyl chloride, 216 grams of 1,3,5-tricarboxycyclohexane was treated with 476 grams of thionyl chloride. This amounted to an excess of thionyl chloride with a mole ratio of thionyl chloride to the tricarboxycyclohexane being 4 to 1. The heterogeneous resulting mixture was stirred and heated to reflux, utilizing a pot temperature of 65° C. The gases liberated from the reaction, which included HCl and $SO_2$, were titrated with a base in order to determine when the reaction was complete. It was found that at a final pot temperature of 82° C. after four hours of refluxing the reaction had gone to completion. The mixture which was heterogeneous became homogeneous when the pot temperature had reached 82° C. The excess thionyl chloride was removed in vacuo leaving a 99% yield of a crude amber liquid which was identified as the 1,3,5-cyclohexane tricarbonyl chloride desired. Vacuum distillation of the crude product at 162–165° C. and .4 to .5 mm. of mercury pressure yielded 65% of a colorless liquid that had refractive index of 1.5045 (25° C.). Analysis of the compound formed gave a carbon content of 40.5, hydrogen 3.9, chlorine 38.9, which agrees closely with that calculated for 1,3,5-cyclohexane tricarbonyl chloride.

EXAMPLE II

The product of Example I was utilized to form in situ the product of this invention. 162.9 grams or .6 mole of 1,3,5-cyclohexane tricarbonyl chloride of Example I was dissolved in 100 ml. of chloroform. This mixture was then added with stirring to 130 grams or 2.0 moles of sodium azide, which was in a biphase water-chloroform mixture. The biphase mixture contained 600 ml. of water and 600 ml. of chloroform. The temperature during the reaction between the sodium azide and the tricarbonyl chloride was maintained at 5° to 10° C. using an ice-water bath. The reaction was completed after one hour of reaction time. After completion of the reaction, the water-chloroform layers were separated. The chloroform layer was then washed three times with 500 ml. portions of water. This chloroform layer which contained the tricarbonyl azide formed, was dried over anhydrous magnesium sulfate, filtered and added slowly to a flask of refluxing chloroform. The tricarbonyl azide rearrangement to the product of this invention occurred during this step and was complete in four hours. Completion of this reaction was determined by measurement of the liberated nitrogen gas which occurred during the rearrangement. The solvent was then removed in vacuo leaving a 98% yield of crude 1,3,5-cyclohexane triisocyanate. The crude product was then purified by vacuum distillation at a boiling point of 134° C. under .15 mm. mercury pressure. The purification gave 80% yield of a colorless mobile material which was identified as 1,3,5-cyclohexane triisocyanate.

The product was then analyzed. The equivalent weight was found to be 74 versus a calculated 69. Infrared scan gave a strong absorption at 4.45 microns indicating the presence of the —NCO groups. Calculated carbon content for the 1,3,5-cyclohexane triisocyanate compound was 52.24%, the found content was 52.8. Calculated hydrogen content is 4.34, found was 4.51; while the calculated nitrogen content was 20.2% and the found was 19.4.

EXAMPLE III

This example sets forth an alternative method for obtaining purification of a crude cyclohexane triisocyanate of this invention, utilizing a low temperature recrystallization technique. A 3-liter round-bottom flask was fitted with a stirrer and thermometer. The flask was purged with nitrogen which was continued at a slow rate throughout the entire crystallization procedure. This flask was charged with 907 grams of the crude cyclohexane triisocyanate obtained as in Example II. Additionally, there was added 1800 ml. of N-butyl chloride. The mixture was then warmed to obtain a homogeneous solution. It was then slowly cooled, wherein crystal formation began between 0 and −10° C. The mixture was then stirred and cooled to −30° C., utilizing a Dry Ice-methanol bath. After a few minutes at −30° C. the stirrer was stopped and the supernatant liquid removed using a sintered glass filter tube. The remaining damp crystals were again dissolved in a minimal amount of N-butyl chloride at a temperature of 30° to 40° C. and recrystallized as set forth above. After removal of one-half of the solvent utilizing a filter stick, the crystals were melted at between 35° to 40° C. The melted crystals were then transferred under a nitrogen blanket to a 1-liter single-neck flask. The balance of the solvent was removed using an evaporator at 50° to 60° C. at .10 mm. mercury pressure. This yielded 462 grams of the cyclohexane triisocyanate the product of this invention, having a 97.3% purity. The combined filtrates were concentrated and an additional 154 grams of the product were obtained by one crystallization from diethyl ether.

Though the most obvious use for the cyclohexane triisocyanate of this invention is as a cross-linking agent, it should be pointed out that the compound can also serve other purposes. For example, the product can be a chemical intermediate for the preparation of, for example, urethanes from mono- or poly-functional amines. Additionally, the compound of this invention could be used in the production of polyurethane foams.

While the method and products of this invention have been described and illustrated in detail, it is to be clearly understood that this is intended by way of illustration and example only and is not to be taken by way of limitation.

What is claimed is:
1. 1,3,5-cyclohexane tricarbonyl chloride.

References Cited

Gershenovich et al., Chem. Abstracts, v. 62, p. 6404f (1965).

Mandasescu et al., Chem. Abstracts, v. 62, p. 16006h–16007a (1965).

LORRAINE A. WEINBERGER, Primary Examiner

E. J. GLEIMAN, Assistant Examiner